United States Patent Office 3,435,591
Patented Apr. 1, 1969

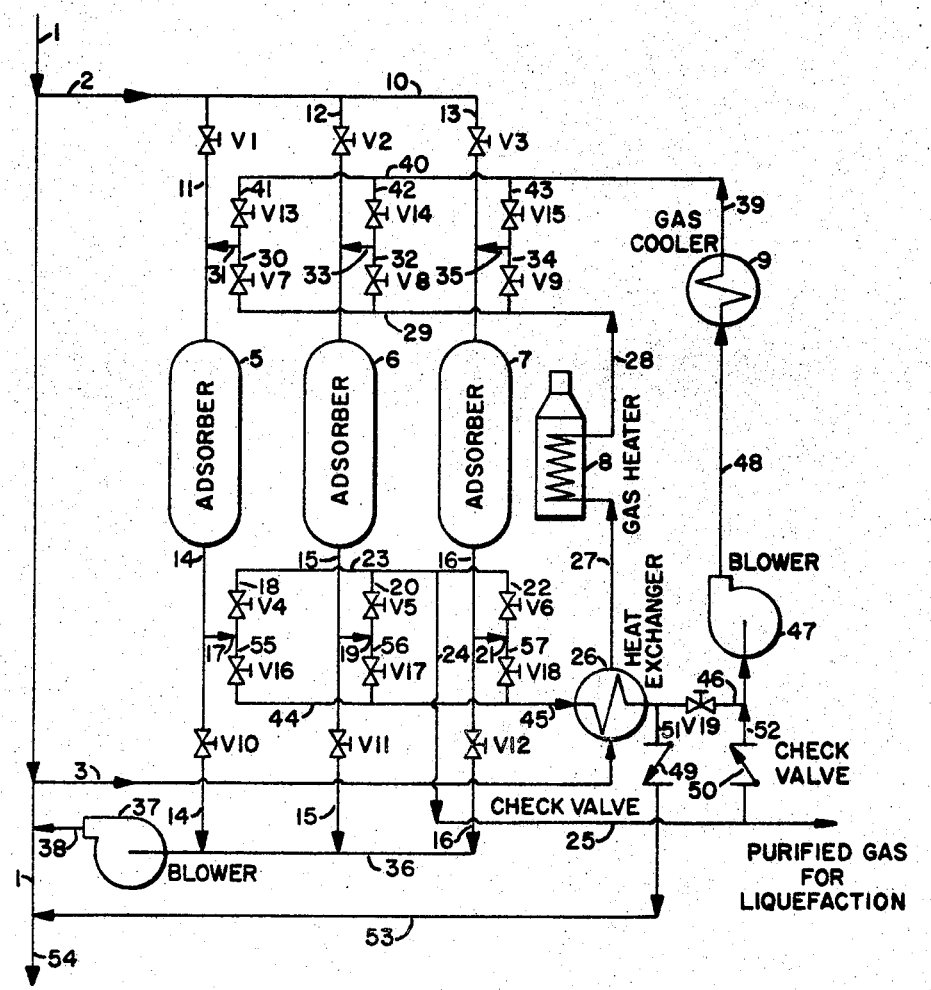

3,435,591
PROCESS AND APPARATUS FOR
PURIFYING GAS
John R. Spencer, Walton D. Greathouse, and James H.
Cheek, Houston, Tex., assignors to Continental Oil
Company, Ponca City, Okla., a corporation of Delaware
Filed Sept. 9, 1966, Ser. No. 578,246
Int. Cl. B01j 1/22; B01d 53/04
U.S. Cl. 55—62    4 Claims

ABSTRACT OF THE DISCLOSURE

A cyclical method and apparatus for removing condensables from part of a hydrocarbon gas stream are disclosed. A first portion of a hydrocarbon feed stream is passed through a sorbent bed wherein condensables are adsorbed and an effluent dry gas is produced; a second portion of the hydrocarbon feed stream is diverted, heated, passed through a second saturated sorbent bed; condensables in the saturated bed are vaporized into the heated flowing gas stream which is then returned to the remainder of the original hydrocarbon stream at a point downstream of the take-off points for the first and second portion streams; a third hot regenerated bed is cooled by a circulating stream of cool gas in a closed cooling circuit. The sorbent beds are cycled through the adsorption, heating and cooling phases consecutively.

This invention relates to a process and apparatus for removing moisture and other condensables from natural gas. More particularly, it is concerned with a process and apparatus for purifying a hydrocarbon gas which is to be subsequently liquefied.

To provide a reserve natural gas supply, some natural gas suppliers, during periods when demand for gas is at a minimum, divert a portion of their available gas to a liquefaction and storage system and sell the remainder. Later, when the demand for natural gas reaches a maximum, the suppliers withdraw this liquefied gas from storage to supply the increased demand. Thus, for example, during the summer suppliers may liquefy and store natural gas and subsequently during the winter use the stored gas when fuel needs are at a maximum.

The natural gas normally available to the supplier is satisfactory for fuel gas. This gas will still retain, however, traces of water, carbon dioxide, heavy hydrocarbons, and organic sulfur compounds. The presence of these and other trace impurities in a gas to be liquefied and stored at cryogenic temperatures creates problems. Natural gas, which consists primarily of methane, remains liquid under atmospheric pressure at temperatures up to about −258° F. Water, carbon dioxide, heavy hydrocarbon, sulfur compounds, and other impurities become solids at these low temperatures and, if present, create problems in transporting the liquefied gas through piping, pumps, and other storage equipment.

These undesirable impurities are present in small quantities, so it is not practical to remove them by fractionation during the liquefaction process. Further, if heavy hydrocarbon compounds are removed, it is of some economic advantage to reclaim them, if only to enrich another stream of gas to be used as a fuel gas.

An object of this invention is to provide a process and apparatus for removing undesired components from a portion of a stream of hydrocarbon gas.

Another object of this invention is to provide a process and apparatus for removing undesired components from a stream of hydrocarbon gas destined to be liquefied subsequently.

Still another object of the invention is to provide method and apparatus for enriching a first portion of a hydrocarbon gas stream with components separated from a second portion of the gas stream.

Other objects, advantages, and features of this invention will become apparent to one skilled in the art upon consideration of the written specification, attached drawing, and appended claims. The drawing is a schematic flow diagram illustrating the process and apparatus according to the present invention.

This invention comprises a cyclical process and apparatus wherein, during each cycle, a first portion of a hydrocarbon gas stream comprising a mixture of hydrocarbon gases is passed through a body of sorbent material to purify the stream by removal of condensables therefrom; simultaneously, a second portion of the original hydrocarbon gas stream is diverted and, after being heated, is passed through a second body of saturated sorbent to desorb and regenerate it, and is then passed to the remainder of the untreated gas stream; a third body of hot regenerated sorbent is cooled by circulating through it a cooling gas (preferably contained in a closed circuit). Each body of sorbent periodically is shifted from a sorbing phase to a heating or regenerating phase to a cooling phase and then back to the sorbing phase. Between shifts of phases, the gas present in the sorbent body that has just completed the heating phase is displaced (with a purified gas from the sorption cycle) into the remainder of the original untreated hydrocarbon stream.

The process of the present invention will now be described with reference to the attached drawing. A main gas stream consisting primarily of methane but containing components which are unwanted impurities in a liquefaction process flows through conduit 1. Two portions of the gas stream are diverted into two sidestreams through conduits 2 and 3. The remaining third portion of the stream continues in an undiverted flow through conduit 54. The first sidestream passing through conduit 2 is passed in contact with sorbent bed 5, which strips the gas of the impurities contained therein. The sorbent used may be any of those commonly used, such as activated carbon or silica gel. The stripped effluent gas is now sufficiently pure for liquefaction. Simultaneously, another bed 7 is being regenerated by the second sidestream flowing through conduit 3. This bed became saturated with condensables in the cycle just previously completed. The second sidestream first is heated by passing it through heater 8 and is then passed in contact with bed 7, which becomes heated and desorbed of condensables. The effluent gas from bed 7 containing the revaporized condensables is then returned to the main gas stream at a point downstream of the points where the two sidestreams originally were diverted. Simultaneously, a third bed 6 is cooled by circulating through it a cool gas. The cooling gas is pumped in a closed circuit through a cooler 9, the bed 6 being cooled, and back to the cooler 9. When it becomes necessary to shift each bed to a new phase in a new cycle, the gas in the heated bed 7 which is to be cooled is first displaced back into the main gas flow stream at a point downstream of the points where the two sidestreams originally were diverted. At the end of this purge or displacement step, the regular three-phase cycle is continued. The source of the displacing gas is the purified product gas from the bed in the sorption base.

By this method, it is possible to purify a portion of a stream of hydrocarbon gas and to discard the removed impurities into the remaining portion of the gas stream. If part of the removed impurities are heavier hydrocarbons, the latter stream thus becomes enriched.

The apparatus of this invention may be readily understood also by referring to the accompanying drawing and the following description. The sorption circuit will be described first. Conduit 1 carries a stream of hydrocarbon gas, a portion of which is to be purified. Conduit 2 connects conduit 1 with the inlet gas manifold 10 which in turn is connected to the inlet of each of the sorbent beds by conduits 11, 12, and 13. Valves V1, V2, and V3 control the flow through conduits 11, 12, and 13. The outlet of each of the sorbent beds 5, 6, and 7 is connected by conduits 14, 17, and 18; 15, 19, and 20; 16, 21, and 22, to outlet manifold 23, which in turn is connected by conduit 24 to purified gas outlet 25. Valves V4, V5, and V6 control the flow of gas through conduits 18, 20, and 22, respectively. From this description of the sorption system, it will be apparent that, by proper manipulation of valves in the system, a portion of gas from conduit 1 can be diverted through a sorbent bed where unwanted impurities are removed and the effluent released to conduit 25. For example, if valves V1 and V4 are opened and valves V2, V3, V5, V6, V10, V16, V7, and V13 are closed, a portion of the gas in conduit 1 will flow through conduit 2, conduit 11, adsorber 5, conduits 14 and 17, conduits 18, 23, 24, and 25.

The heating circuit begins where conduit 3 extends from conduit 1 and continues through heat exchanger 26, conduit 27, heater 8, conduit 28, and heater inlet manifold 29. Conduits 30, 31, and 11; 32, 33, and 12; 34, 35, and 13 connect the heater inlet manifold 29 to the inlets of adsorbers 5, 6, and 7. Valves V7, V8, and V9 control the flow of heating gas to the adsorbers. The outlets of adsorbers 5, 6, and 7 are connected by conduits 14, 15, and 16 to heating gas outlet manifold 36, blower 37, conduit 38, and conduit 1. Valves V10, V11, and V12 control the flow of heating gas from the adsorbers. Thus, it will be apparent that by proper manipulation of valves in the heating circuit, a second portion of gas may be diverted from the main inlet stream 1, heated, passed through a saturated sorbent bed to regenerate the bed, and returned to the main gas stream. For example, if valves V3, V15, V8, V7, V10, V11, V6, and V18 are closed and valves V9 and V12 opened, a second portion of the gas in conduit 1 will flow through conduit 3, heat exchanger 26, conduit 27, heater 8, conduit 28, conduits 34, 35, and 13, adsorber 7, conduits 16 and 36, blower 37, conduit 38, and back to conduit 1.

The cooling circuit is a closed cooling circuit. Conduit 39 connects cooler 9 to cooling gas inlet manifold 40, which in turn is connected to the inlets of adsorbers 5, 6, and 7 by conduits 41, 31, and 11; 42, 33, and 12; 43, 35, and 13. Valves V13, V14, and V15 control the flow of cooling gas through conduits 41, 42, and 43. The outlets of adsorbers 5, 6, and 7 are connected to cooling gas outlet manifold 44 by conduits 17 and 55, 19 and 56, 21 and 57. Valves V16, V17, and V18 control the flow of cooling gas through conduits 55, 56, and 57, respectively. Conduit 45, heat exchanger 26, conduit 46, blower 47, and conduit 48 complete the cooling circuit. Valve V19 controls flow through conduit 46 but is closed only when changing the system from one cycle to another when the bed next to be cooled is purged. Thus, by proper manipulation of valves in the cooling circuit, cooling gas can be circulated in a closed cycle through the gas cooler, the bed being cooled, the heat exchanger, and the blower.

For example, if valves V2, V5, V8, V11, V15, V13, V16, and V18 are closed, and valves V14, V17, and V19 are open, cooling gas will circulate through cooler 9, conduit 39, manifold 40, conduits 42, 33, and 12, adsorber 6, conduits 15, 19, 56, manifold 44, conduit 45, heat exchanger 26, conduit 46, blower 47, conduit 48, and back to cooler 9. The heat exchanger 26, while not essential to the system, improves the efficiency by transferring heat picked up by gas in the cooling circuit to gas going to the heater in the heating circuit.

When it becomes desirable to change to a new cycle, the bed in the cooling circuit will be switched into the sorption circuit, the bed in sorption circuit into the heating circuit, and the bed in the heating circuit into the cooling circuit. Before cooling, however, it is desirable to displace the gas present in the hot regenerated bed, since this gas contains condensables which will preload the bed when it is cooled. For this purpose, check valve 49 in conduit 51 connecting conduit 46 and conduit 53, and check valve 50 in conduit 52 connecting conduit 46 and conduit 25 are provided. When the hot bed to be cooled is switched into the cooling circuit and valve V19 in conduit 46 is closed, a portion of the gas in conduit 25 passes through check valve 50 into conduit 46, blower 47, and the remainder of the cooling circuit. Correspondingly, gas in the hot bed is displaced through cooling manifold 45, heat exchanger 26, part of conduit 46, conduit 51, check valve 49, conduit 53, and into the main flow stream conduit 1. At the end of this displacement, valve V19 is opened, and the cooling circuit begins a cooling phase. Check valve 50 serves an additional function in that it permits gas to be drawn into the cooling circuit as cooling progresses and gas pressure in the circuit declines below a desired level.

The following table shows the sequence of valve manipulations to carry the process through three cycles. At the end of three cycles, each adsorber has returned to its original phase.

ADSORBER AND VALVE SEQUENCE

| Adsorber: | | | | | | |
|---|---|---|---|---|---|---|
| 5 | Sorbing | Heating | Heating | Purging | Cooling | Sorbing |
| 6 | Cooling | Sorbing | Sorbing | Heating | Heating | Purging |
| 7 | Heating | Purging | Cooling | Sorbing | Sorbing | Heating |
| Valves: | | | | | | |
| V1 | O | C | C | C | C | O |
| V2 | C | O | O | C | C | C |
| V3 | C | C | C | O | O | C |
| V4 | O | C | C | C | C | O |
| V5 | C | O | O | C | C | C |
| V6 | C | C | C | O | O | C |
| V7 | O | C | C | C | C | O |
| V8 | C | C | C | O | O | C |
| V9 | O | C | C | C | C | O |
| V10 | C | O | O | C | C | C |
| V11 | C | C | C | O | O | C |
| V12 | O | C | C | C | C | O |
| V13 | C | C | C | O | O | C |
| V14 | O | C | C | C | C | O |
| V15 | C | O | O | C | C | C |
| V16 | C | C | C | O | O | C |
| V17 | O | C | C | C | C | O |
| V18 | C | O | O | C | C | C |
| V19 | O | C | O | C | O | C |
| Check valve: 49 | C | O | C | O | C | O |
| Check valve: 50 | (*) | O | (*) | O | (*) | O |

*Closed except for gas passed into cooling circuit to compensate for pressure decline.
C=valve closed, O=valve opened.

Although not shown in the drawing, it may be desirable to locate temperature sensing elements at points adjacent the downstream end of the sorbent beds, these temperature sensing elements being used in a control system to govern the changing of valves in the system.

The following example will further illustrate our invention.

*Example*

Raw natural gas flows through conduit 1 in the drawing at a rate of 700MM c.f./day. A portion of the raw natural gas feed in conduit 1 is processed under the following conditions. Adsorbers 5, 6, and 7 each spend about 90 minutes on reactivation and about 90 minutes being cooled, including a 13-minute purge period. The cycle is switched from one phase to the next responsive to measurement of the exit gas temperature of the adsorber being regenerated reaching 250° F. Feed gas in conduit 2 is at about 70° F. and 400 p.s.i.a. in an amount of about 10,000M c.f./day. Adsorber vessels 5, 6, and 7 each have a volume of 172.5 ft.$^3$, and operate at a pressure of about 394–405 p.s.i.a. Each adsorber contains about 3,700 lbs. of activated carbon (8 x 10 mesh) and about 1,700 lbs. of silica gel. Adsorbent temperature is about 80° F. during adsorption, a maximum of about 575° F. and an average of about 550° F. during regeneration, and is cooled to about 90° F. during the cooling phase. The purified gas from conduit 25 is in an amount of about 9,550M c.f./day at about 85–90° F. and 394 p.s.i.a. Heating gas is passed through conduit 28 in an amount of about 1,350M c.f./day at about 600° F. and 395 p.s.i.a. Effluent gas from the heating circuit in manifold conduit 36 has a temperature of about 90° F. to a maximum temperature of about 250° F. and is forced through in an amount of about 1,580M c.f./day. Cool gas circulating through the cooling circuit in conduit 39 has a temperature of about 90° F. and flows at the rate of 1,320M c.f./day. Average compositions at various points throughout the system are tabulated below in mol percentages.

| Conduit | Carbon dioxide | Water vapor | Methane | Ethane | Propane plus |
|---|---|---|---|---|---|
| 2 and 3 | 0.10 | 0.013 | 93.987 | 5.52 | 0.38 |
| 25 | 0.06 | Trace | 96.54 | 3.40 | |
| 36 | 0.34 | .09 | 79.66 | 17.38 | 2.53 |
| 53 | 0.05 | Trace | 83.71 | 14.51 | 1.73 |
| 54 | 0.101 | 0.013 | 93.952 | 5.549 | .385 |

As many possible embodiments may be made of the invention without departing from the scope thereof, it is to be understood that all matter herein set forth or shown in the accompanying drawing is to be interpreted as illustrative and not in a limiting sense. The invention, having been described, what is claimed is:

1. Apparatus for separating sorbable components from a portion of a mainstream of gas by cyclic sorption which comprises:
   (a) a plurality of vessels containing a solid sorbent;
   (b) a first conduit means communicating with a source of gas containing vaporized condensables;
   (c) a plurality of second conduit means communicating between the inlet ends of said plurality of vessels (a) and said first conduit means (b);
   (d) a third conduit for delivering gas from which sorbable components have been removed;
   (e) a plurality of fourth conduit means communicating between the effluent ends of said plurality of vessels (a) and said third conduit (d);
   (f) heating means;
   (g) a fifth conduit communicating between said first conduit means (b) and said heating means (f);
   (h) a plurality of sixth conduit means communicating between said heating means (f) and the inlet ends of said plurality of vessels (a);
   (i) a plurality of seventh conduit means communicating between the effluent ends of said plurality of vessels (a) and said first conduit means (b);
   (j) gas cooling means and means for circulating a gas through said cooling means;
   (k) a plurality of eighth conduit means communicating between the downstream side of said cooling and circulating means (j) and the inlet ends of said plurality of vessels (a);
   (l) a ninth conduit connected at one end to said means for cooling and circulating (j);
   (m) a plurality of tenth conduit means communicating between the effluent ends of said plurality of vessels (a) and the other end of said ninth conduit (l);
   (n) a valve intermediate the ends of said conduit (l);
   (o) eleventh conduit means communicating between said ninth conduit (l) on the upstream side of said valve means (n) and said first conduit means (b);
   (p) a valve intermediate said eleventh conduit means (o);
   (q) twelfth conduit means communicating between said ninth conduit (l) on the downstream side of said valve (n) and said third conduit (d);
   (r) a valve intermediate said twelfth conduit means (q); and
   (s) valve means in each of said plurality of second, fourth, sixth, seventh, eighth and tenth conduit means of (c), (e), (h), (i), (k), and (m), respectively.

2. The method of removing sorbable components from part of a main stream of hydrocarbon gas comprising:
   (a) diverting a first portion of the mainstream of hydrocarbon gas into a first sidestream;
   (b) contacting said first sidestream with a first bed of sorbent material thereby removing sorbable components from said first sidestream;
   (c) removing a stripped gas stream from said first bed, said stripped gas stream representing a desired product;
   (d) diverting a second portion of the mainstream of hydrocarbon gas into a second sidestream;
   (e) heating said second sidestream;
   (f) contacting said heated second sidestream with a second bed of sorbent material containing sorbed components from a previous cycle of said method, thereby heating said sorbent material and desorbing components sorbed thereon;
   (g) passing the effluent gas from said second bed of (f) to the mainstream of hydrocarbon gas remaining after steps (a) and (d) at a point in the mainstream downstream of the point for diverting said first portion of (a) and said second portion of (d) and downstream of said first bed of sorbent material;
   (h) circulating in a closed circuit a cool stream of gas through a third bed of sorbent material which was heated in a previous cycle, thereby cooling said sorbent material; and
   (i) periodically shifting each bed sequentially to the sorption step of (b), the heating step of (f), and the cooling step of (h).

3. The method of claim 2 wherein the diverted stream of (d) is passed in heat exchange relationship with the cool stream of gas of (h) before step (e).

4. The method of removing sorbable components from part of a mainstream of hydrocarbon gas comprising:
   (a) diverting a first portion of the mainstream of hydrocarbon gas into a first sidestream;
   (b) contacting said first sidestream with a first bed of sorbent material thereby removing sorbable components from said first sidestream;
   (c) removing a stripped gas stream from said first bed, said stripped gas stream representing a desired product;
   (d) diverting a second portion of the mainstream of hydrocarbon gas into a second sidestream;
   (e) heating said second sidestream;
   (f) contacting said heated second sidestream with a second bed of sorbent material containing sorbed components from a previous cycle of said method, thereby heating said sorbent material and desorbing components sorbed thereon;
   (g) passing the effluent gas from said second bed of (f) to the remainder of the mainstream of hydrocarbon gas at a point downstream of the point for diverting said first portion of (a) and said second portion of (d) and downstream of said first bed of sorbent material;

(h) circulating in a closed circuit a cool stream of gas through a third bed of sorbent material which was heated in a previous cycle, thereby cooling said sorbent material;

(i) periodically shifting each bed sequentially to the sorption step of (b), the heating step of (f), and the cooling step of (h); and (j) prior to shifting the second bed of sorbent in the heating step of (f) to the cooling step of (h), purging said second bed by diverting a portion of the stripped gas from a bed in the sorption cycle through said second bed to be subjected to the cooling step (h) and conducting the effluent from said second bed back to the mainstream of hydrocarbon gas.

References Cited

UNITED STATES PATENTS

| | | |
|---|---|---|
| 3,008,539 | 11/1961 | Francis. |
| 3,061,992 | 10/1962 | Russell. |
| 3,137,549 | 6/1964 | Kilgore et al. |
| 3,161,489 | 12/1964 | Dwyer et al. |
| 2,738,858 | 3/1956 | Drew _____ 55—62 X |
| 3,121,002 | 2/1964 | Kilgore et al. _____ 55—180 X |
| 3,124,438 | 3/1964 | Lavery _____ 55—20 |

REUBEN FRIEDMAN, *Primary Examiner.*

JOHN ADEE, *Assistant Examiner.*

U.S. Cl. X.R.

55—179